Figure 1:
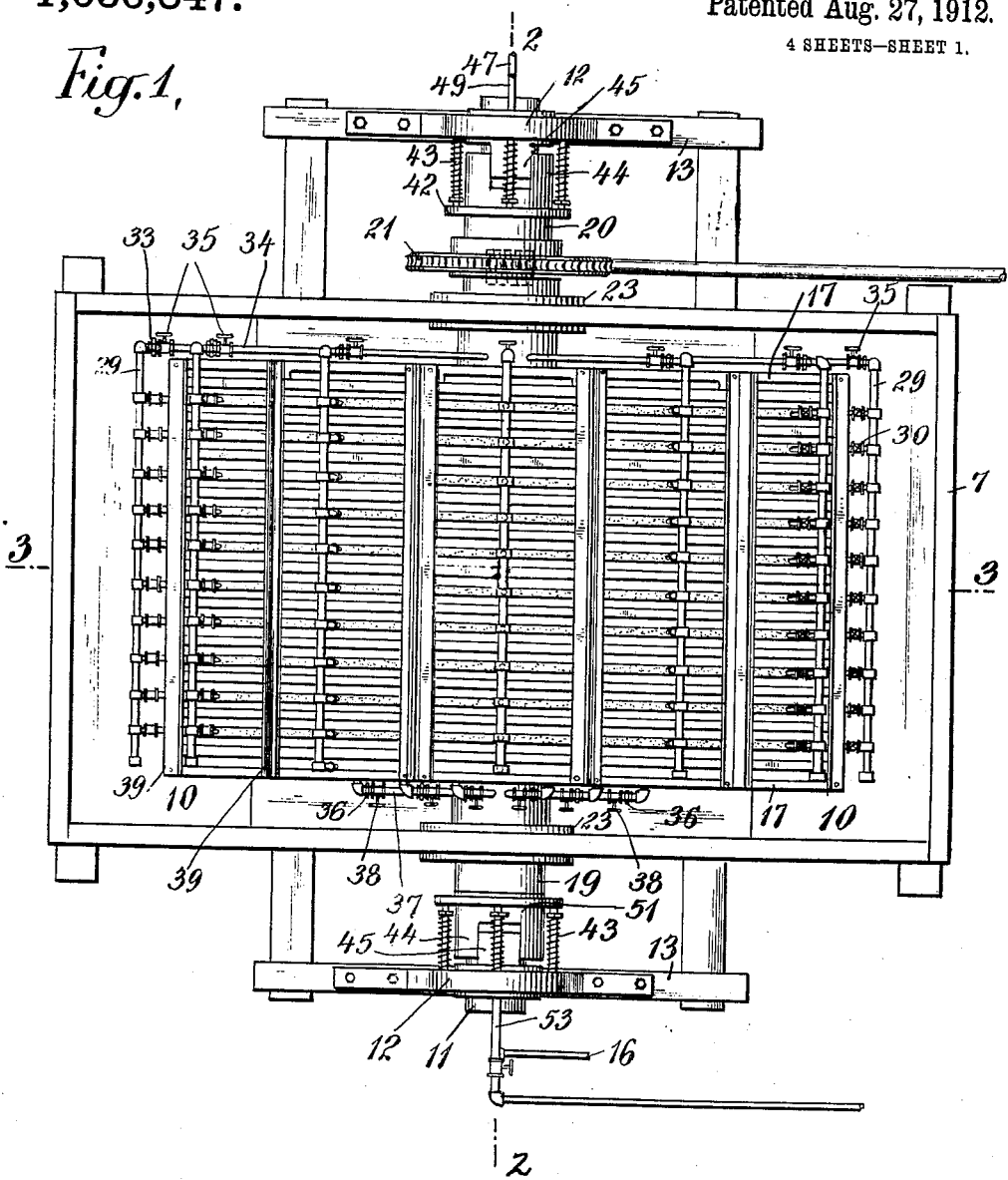

A. A. HOLLAND.
CONTINUOUS ROTARY FILTER.
APPLICATION FILED MAR. 13, 1911.

1,036,847.

Patented Aug. 27, 1912.
4 SHEETS—SHEET 1.

WITNESSES:

INVENTOR:
Arthur A. Holland,
BY
ATTORNEYS

A. A. HOLLAND.
CONTINUOUS ROTARY FILTER.
APPLICATION FILED MAR. 13, 1911.

1,036,847.

Patented Aug. 27, 1912.

4 SHEETS—SHEET 3.

WITNESSES:

INVENTOR:
Arthur A. Holland,
BY
ATTORNEYS.

A. A. HOLLAND.
CONTINUOUS ROTARY FILTER.
APPLICATION FILED MAR. 13, 1911.
1,036,847.
Patented Aug. 27, 1912.
4 SHEETS—SHEET 4.
Fig. 7,
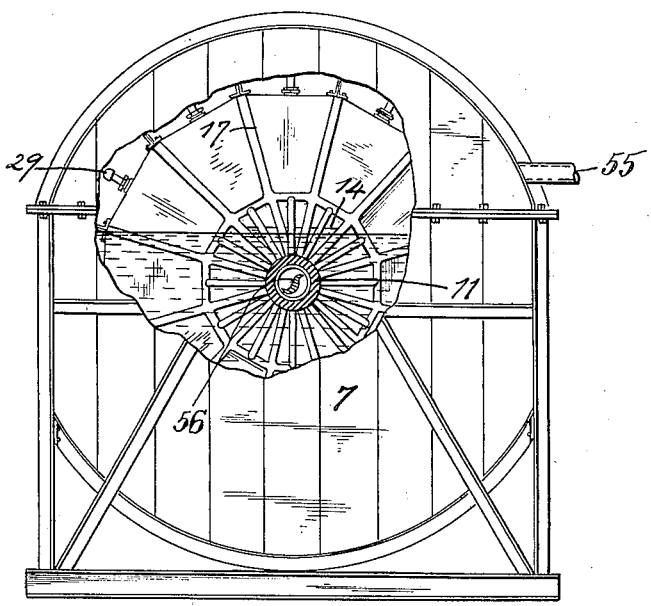
Fig. 8,
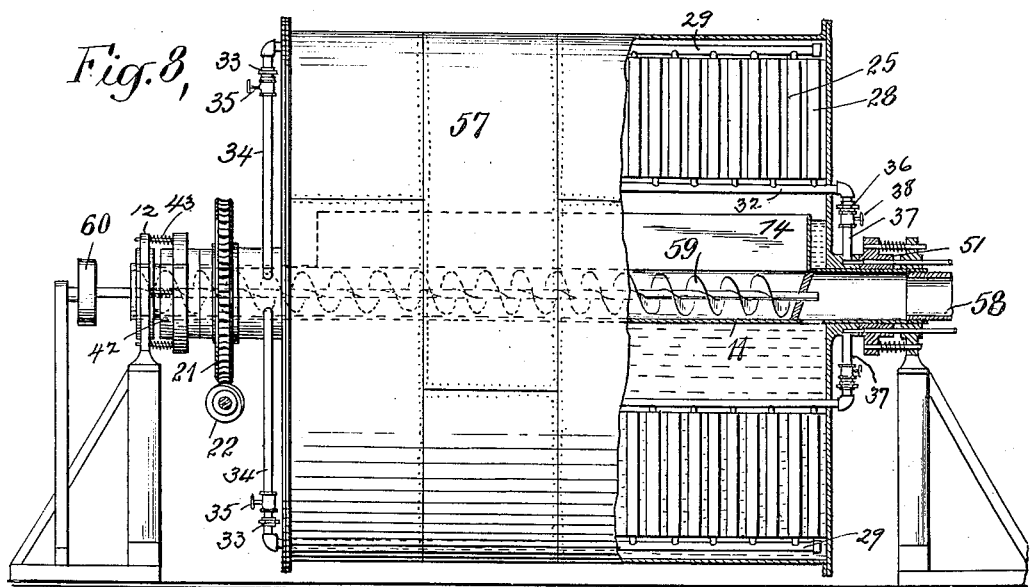
WITNESSES:
INVENTOR:
Arthur A. Holland,
BY
ATTORNEYS.

UNITED STATES PATENT OFFICE.

ARTHUR A. HOLLAND, OF HASTINGS-UPON-HUDSON, NEW YORK, ASSIGNOR OF ONE-THIRD TO EDWIN K. SCHEFTEL, OF NEW YORK, N. Y.

CONTINUOUS ROTARY FILTER.

1,036,847. Specification of Letters Patent. Patented Aug. 27, 1912.

Application filed March 13, 1911. Serial No. 614,085.

*To all whom it may concern:*

Be it known that I, ARTHUR A. HOLLAND, residing at Hastings-upon-Hudson, county of Westchester, State of New York, have invented certain new and useful Improvements in Continuous Rotary Filters; and I do hereby declare the following to be a full, clear, and exact description of the invention, such as will enable others skilled in the art to which it appertains to make and use the same.

Apparatus involving my invention properly belongs to the class of filters in which the operation is continuous and in which the filtering surface is divided and applied to a series of separately controlled sections arranged upon a rotating frame work and which are consecutively brought into play by rotation to perform in proper sequence the operations of separating the suspended solids from liquids, and washing and discharging them.

It is customary in devices of this character to cause the filter sections carried upon the frame work to be immersed in the mixture to be filtered as they pass through the lower part of their circular path about the axis of the drum and while so immersed to have suction applied to their interiors from suitable vacuum producing apparatus, so that the surrounding liquid may be drawn in through the filtering material leaving the solids caked upon their outer surfaces; to continue this suction after the filter sections leave the mixture and to apply a washing fluid which is sucked through the adhering cake of solids and, when the filter sections have reached a point in their path above a suitable hopper to discontinue the suction and introduce a fluid under some pressure into their interiors, which fluid then escapes through the filtering material dislodging the cake of solids. The solids fall into the hopper and are discharged, the liquids having previously been drawn away through suitable conduits in the direction of the vacuum producing apparatus.

The object of this invention is to produce certain improvements in apparatus for continuously carrying out this process of filtration and certain desirable variations thereof hereinafter described, in a more efficient, satisfactory and practical manner, and which is more adaptable to the conditions under which these devices are employed and to those constantly arising during such employment.

Filters of this character are employed in the cyanid treatment of ore slimes for the purpose of separating the solids from the liquors containing the dissolved values.

Figure 2:
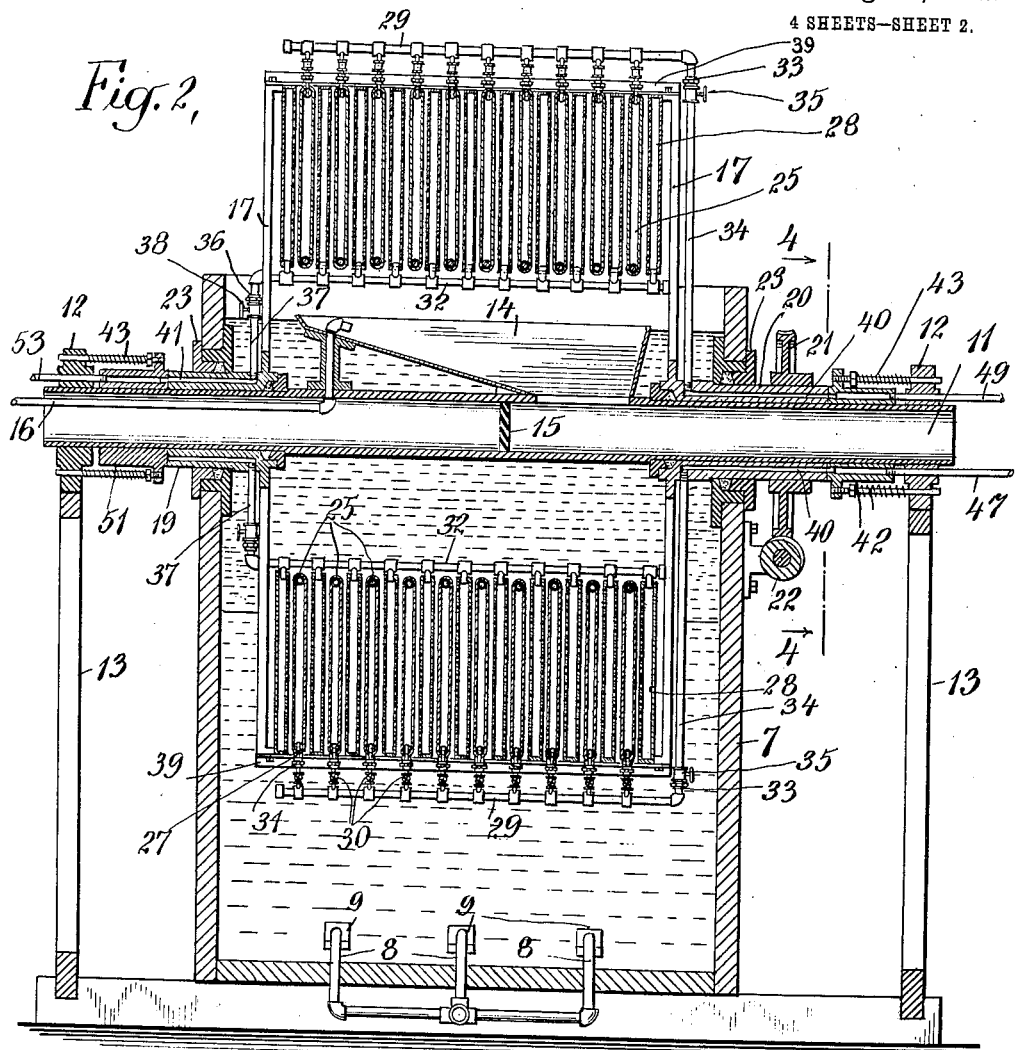
Figure 3:
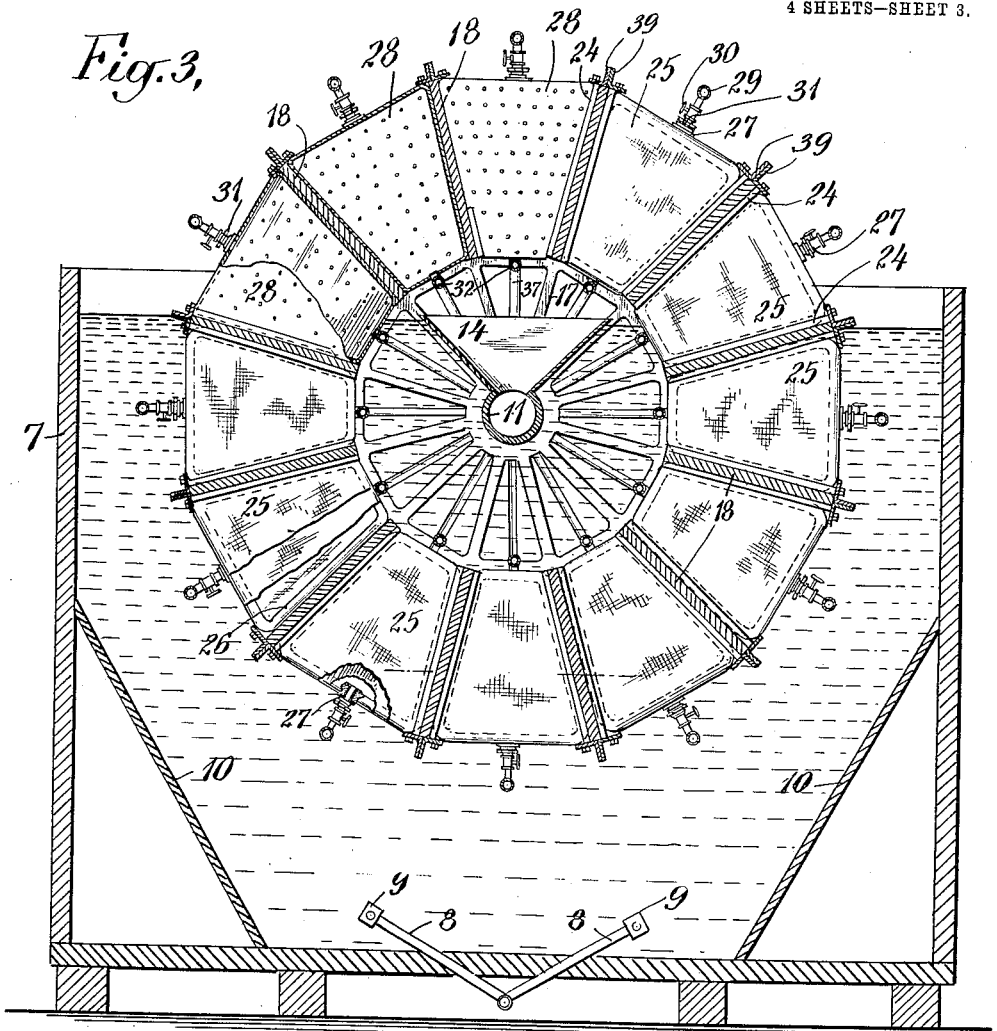
Figure 6:
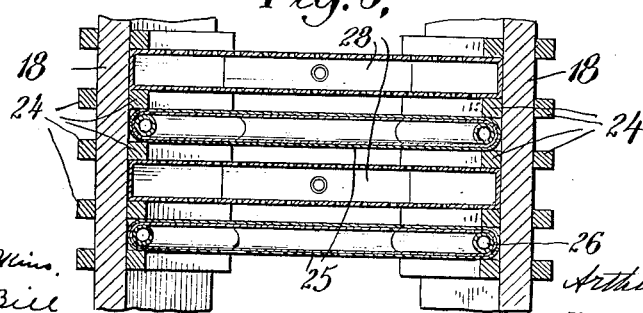

In the drawings; Figure 1 is a plan view of one embodiment of my improved filter; Fig. 2 is a vertical section on the line 2—2 of Fig. 1; Fig. 3 is a vertical section on the line 3—3 of Fig 1; Fig. 4 is a face view of one of the valves for controlling the filter chambers; Fig. 5 is a section on the line 5—5 of Fig. 4; Fig. 6 is a detail in section taken on line 6—6 of Fig. 3; Fig. 7 is an end elevation of a modified form having a closed tank; and Fig. 8 is a front elevation of still another modification in which the tank rotates with the filter frame.

Referring to the drawings: A tank 7 serves as the container, into which the mixture to be separated is introduced in any suitable manner, as, for instance, by pouring it in at the open top of the tank, and, as it is desirable to keep the solid matter of the mixture in suspension within the tank, pipes 8 may be led from any suitable source of fluid supply, such as a compressed air reservoir or pump, to points within the tank near its bottom, and these may be provided with check valves 9 to prevent the backflow of the mixture into the pipes when no air is issuing therefrom. The air or other fluid so injected near the settling place of the solids acts to prevent such settling and the currents set up by this agitation may be deflected upwardly by inclined walls or baffles 10 which also conform the tank more in accordance with the contained apparatus hereinafter to be described.

A stationary tube 11 is secured at either end in pillow blocks 12, 12, mounted on supports 13 which are part of a framework upon which the tank 7 rests.

The tube 11 passes through the walls and interior of the tank 7 and a hopper 14 is built upon its upper side within the tank 7, an outlet being provided from the hopper through the upper wall of the tube to the interior thereof, the tube serving as a channel for the egress of material from the hopper. In the embodiment illustrated it is intended that the material from hopper 14 shall pass out of the right hand end (see Fig. 2) only of the tube 11, and a partition 15 is shown in the tube, closing it beyond the hopper opening; but both ends of the tube may serve as means of egress for the material if desired. A pipe 16 is shown leading through the tube 11 into the hopper 14 and may be connected to a suitable fluid supply to flush the hopper.

A drumlike frame is built with two cast end spiders 17, connected by boards or plates 18, equally spaced about its axis and laid radially to form a series of like pockets of segmental cross section, and said frame is mounted upon the tube 11 within the tank 7. The spiders 17 are disposed between the hopper 14 and the walls of the tank 7, and the boards 18 are set at a distance from the axis sufficient to allow them to pass over the hopper 14 when the frame revolves. The hubs 19 and 20 of the spiders 17 fit the tube 11 closely and pass through the walls of the tank 7, and a worm wheel 21 is secured on one of these hubs 20 outside of the tank and is engaged by a worm 22 driven from any suitable source of power to slowly rotate the frame within the tank. Stuffing boxes 23 are provided in the walls of the tank embracing the hubs 19 and 20. The opposite faces of each of the boards 18 are provided with like series of parallel spacing battens 24 (see Fig. 6) forming grooves for the reception of the filtering elements hereinafter described.

The filtering elements or leaves 25 each consists of a frame 26, of segmental or keystone shape, and are adapted to fit into the pockets of the rotating frame sliding into opposite grooves between the battens 24 on the boards 18. These frames 26 may be made of bent pipe or rod and are each provided with an outlet 27 at about the center of their longer end reach. The frames 26 are designed to be covered with filtering material such as one or more bags of canvas sewn or otherwise secured thereon.

When filtering material is applied to a frame 26 a thin chamber is formed with an outlet through its longer end reach. Cocoa matting or other open material may be placed within this chamber to prevent collapse when suction is applied.

The covered filtering frames 26 are placed in the grooves between the battens 24, alternating with and spaced by the battens, from wash-boxes 28. These wash-boxes 28 consist of boxes of metal or other suitable material of substantially the same shape and size as the filter chambers, and their sides are pierced with a number of fine holes from which fluid from the box is to be sprayed upon the contiguous surfaces of the filter chambers on each side of the box. The inlet for fluid in the wash-boxes 28 is through their smaller end reach.

The outlets at the outer ends of all of the filtering chambers, in each pocket of the rotating frame, are connected to a manifold 29, each branch of which, leading to a filtering chamber, is provided with a valve 30 and a union 31 between this valve and the filtering chamber.

The inlets at the inner ends of all of the wash-boxes, in each pocket of the rotating frame, are connected to a manifold 32.

Each manifold 29 is connected by a union 33 with a pipe 34 leading to the hub 20, and these pipes are each provided with a valve 35. Each manifold 32 is connected by a union 36 with a pipe 37, leading to the hub 19, and these pipes are each provided with a valve 38.

It will be seen that any one of the filtering chambers may be rendered inoperative by closing the valve 30 leading thereto, all of the filter chambers in one pocket of the rotating frame may be rendered inoperative by closing the valve 35 leading to the manifold of that series, and that the wash-boxes in any pocket of the rotating frame can be collectively rendered inoperative by closing the proper valve 38. This arrangement is provided in view of the probability of one filtering chamber becoming ineffective because of wear, puncture or other injury, which would necessitate cutting off its communication with those remaining, or with the discharge, or might necessitate its removal, in which case the passage leading to it would have to be closed. Moreover, it is possible by these means to remove the entire series of filtering chambers in a pocket, or those from several pockets to reduce the filter surface, or for any other reason, closing the proper valve or valves 35.

When all of the filtering chambers and wash-boxes of one pocket have been put in place they are secured by caps which may conveniently be angle irons 39 laid over their corners and screwed to the spider arms of the rotating frame, so as to be readily removable without stopping the rotation of the rotary frame.

When it is desired to remove a filter chamber or leaf, the valve 35 of the pocket in which the chamber occurs is closed, then the angle irons 39 are removed from that pocket, the union 33 uncoupled and that series of filter chambers lifted out, when the union 31 of the required chamber is uncoupled and a new chamber substituted; or, if no substitution is to be made, the valve 31 of the empty branch is closed and the parts reassembled.

Each of the pipes 34 connected with the filter chamber manifolds 29 connects with a passage 40 which runs through to the outer face of the hub 20. Each of the pipes 37, connected with the wash-box manifolds 32, connects with a passage 41, which runs through to the outer face of the hub 19. The outlets of the passages 40 in the outer face of hub 20 are arranged equidistant in a circular series about the axis of the hub, and a similar arrangement obtains with reference to passages 41 in hub 19.

A face valve 42 shown in detail in Figs. 4 and 5 is mounted on the tube 11, and is pressed by springs 43 against the outer face of the hub 20, and is held against rotation by jaws 44 upon its outer end, engaging with complementary jaws 45 on the pillow block 12, permitting of some longitudinal movement of the valve as the springs seat it against the hub. This valve 42 is provided with a port 46 which has the form of an incomplete circle, and is connected by a pipe 47 with suitable vacuum producing and liquid receiving apparatus. The port 46 registers with the outlets of the passages 40 in the hub 20 and, owing to its length, permits suction in the filtering chambers throughout the greater part of a revolution of the rotating frame, only cutting off the suction from a chamber when it has risen to the upper part of its circular path. A second port 48 is provided in the valve 42, and occupies a position midway between the ends of the port 46. This port 48 is connected, through a pipe 49, with a suitable source of compressed air, and registers with the passages 40 at a time when the suction is cut off from the filtering chambers, admitting thereto compressed air. Packing rings 50 are disposed in channels between the valve 42 and the face of the hub 20 to insure a tight joint. Another face valve 51 similar to valve 42 in all respects, except as to the number, extent and location of the ports, abuts against the outer face of the hub 19. This valve 51 has but one port, which is connected, through a pipe 53, with a suitable source of water under pressure, and this port is so positioned or "timed" that it registers with the passage 41, leading to the wash-boxes of one pocket, a little before the suction is cut off from the filtering chambers of that pocket, and continues to so register until the compressed air is cut off from the filtering chambers of that pocket. This "timing" is arbitrary, that described being suitable in some cases while in others a more desirable setting might be found.

The operation of the apparatus described above as used in treating slimes with cyanid is as follows: The tank 7 is kept filled with "pulp", which is a mixture of slimes and cyanid, to the "pulp line" which is indicated on the drawings as being at a level just below the mouth of hopper 14 and the solids are kept in suspension by the agitation produced by the air issuing from pipes 8. The frame carrying the filter chambers is slowly rotated by the worm 22 and as the filter chambers contained in each pocket of the rotating frame pass downwardly into the pulp a suction is effected within them by the opening of communication between their interiors and the vacuum producing apparatus through passages 40 coming into registry with port 46 in the valve 42, and this suction is maintained during the travel of these chambers through the pulp, drawing the liquids through the filtering material to the interior of the chambers and thence through the piping and the valve 42 to a suitable receiving container, during which time the solids collecting upon the outer surfaces of the filtering material of the filtering chambers form an adhering cake which is partially dried or subjected to an "air bleach" as it passes up and out of the pulp with the continued rotation of the frame, due to the continuance of the suction during the period. At about this time, communication is established between the wash-boxes 28 of this pocket and the water supply, by the registering of the connected passage 41 in hub 19 with the port in valve 51, and water is sprayed from the apertures in these boxes upon the cakes of solids and drawn therethrough into the filtering chambers thoroughly washing the cakes of solids and displacing any solution remaining in the cakes. The pocket containing the filtering chambers or leaves under discussion has now reached a point where it will discharge into the hopper 14, and the passage 40 in hub 20 connected with these chambers now passes beyond the end port 46 in valve 42 cutting off the suction and immediately comes into registry with port 48 admitting compressed air to the chambers, which dislodges the cakes of solids, which then fall, directed by the board 18 forming the pocket, into the hopper 14 from which they pass aided by the water from flushing pipe 16 through the tube 11 to the exterior of the tank 7. The compressed air is cut off, the wash water is continued momentarily to wash the surface of the filtering material, and the suction is applied to the filter chambers as they dip beneath the surface of the pulp beginning the cycle anew. Each series of filtering chambers in one of the pockets of the frame is carried through this cycle of operation as the pockets consecutively follow one another.

A modified form is shown in Fig. 7 in which the tank incloses the rotatable frame and air pressure is applied directly to its interior as, for instance, by means of the air pressure supply pipe 55, producing the filtering action by escaping through the filtering material into the filtering chambers and thence through the pipes and valve to a liquid receiving container maintained at atmospheric pressure. This obviates the use of a partial vacuum for suction, and admits of a more powerful action by employing pressures which may be increased to any desired degree above the countervailing atmospheric pressure in the receiver, and which may therefore be far in excess of any pressure that can be produced by a partial vacuum. In this instance, (as well as in the modification shown in Fig. 8 and hereinafter to be described) the discharge through the hollow axle is governed and restrained by means of a feed screw 56 so as to preserve the predetermined pressure within the tank by appropriately varying the rate of discharge, and requiring the issuing material to constantly occupy the discharge passage. The compressed air for discharging the cake formed on the filter surfaces must be admitted under relatively higher pressure than that prevailing in the tank, as will readily be understood.

In the modification shown in Fig. 8, the tank or container 57 rotates with the rotatable frame. The material is admitted under pressure through the axial pipe 58, the pulp level being indicated in the drawing as just below the mouth of the hopper. This level is maintained in any suitable manner, as for instance, by a float-controlled valve, or otherwise. The screw 59, corresponding in function and location to the screw 56 of Fig. 7, carries the pulley 60 by which it is driven.

A characteristic advantage of the modification shown in Fig. 8 is that because of the rotation of the tank or container 57, agitation of the pulp, to prevent settling, is maintained without the employment of air injectors or other supplemental agitators for that purpose.

Instead of supplying the material, under pressure, in the modification shown in Fig. 8, it may be supplied by gravity aided by suction when suction is used in connection with the filter chambers.

Having thus described my invention, what I claim is:

1. In filtering apparatus of the class described, a rotatable frame, a filter mounted on said frame, and a washing device mounted on said frame, said washing device being of substantially like area with and registering with and suitably spaced from said filter; substantially as described.

2. In filtering apparatus of the class described, a rotatable frame, a series of filters mounted on said frame, and a series of washing devices on said frame alternating with and suitably spaced from said filters; substantially as described.

3. In filtering apparatus of the character described, a rotatable frame carrying a series of elements, comprising alternate filters and washing devices each lying in the plane of rotation of said frame; substantially as described.

4. In filtering apparatus of the character described, a rotatable frame carrying a series of flat elements, comprising alternate filters and washing devices each lying in the plane of rotation of said frame, the adjacent elements of said series registering with and spaced from one another; substantially as described.

5. In filtering apparatus of the character described, a rotatable frame carrying a series of filters of substantially wedge or keystone shape, lying in the plane of rotation of said frame, and washing devices arranged between said filters; substantially as described.

6. In filtering apparatus of the character described, a rotatable frame carrying a series of filters of substantially wedge or keystone shape, lying in the plane of rotation of said frame, and washing devices arranged between said filters, said washing devices being of substantially the same shape as the filters and likewise lying in the plane of rotation of the frame, substantially as described.

7. In filtering apparatus of the character described, a rotatable frame carrying a series of filters of substantially wedge or keystone shape, lying in the plane of rotation of said frame, washing devices arranged between said filters and a stationary hopper located within the frame and into which the filters discharge; substantially as described.

8. In filtering apparatus of the character described, a rotatable frame carrying a series of filters of substantially wedge or keystone shape, lying in the plane of rotation of said frame, washing devices arranged between said filters, a stationary hopper located within the frame, and a hollow stationary axle for receiving the discharge from the hopper; substantially as described.

9. In filtering apparatus of the character described, a rotatable frame, a series of filters mounted on said frame, and a series of washing devices on said frame alternating with and suitably spaced from said filters, the washing devices having perforated side walls for directing a washing spray laterally from each of said walls upon the filters; substantially as described.

10. In filtering apparatus of the character described, a rotatable frame, filter sections removably mounted on said frame, and wash boxes removably mounted on said frame, said wash boxes alternating with and registering with said filter sections; substantially as described.

11. In filtering apparatus of the character described, a hollow shaft, a hopper mounted on and adapted to discharge through the interior of said hollow shaft, and a series of filters arranged side by side and radial to the hollow shaft and mounted to rotate on said hollow shaft and over said hopper; substantially as described.

12. In filtering apparatus of the character described, a hollow shaft, a hopper mounted on and adapted to discharge through the interior of said hollow shaft, a rotatable frame journaled on said hollow shaft, and a series of filters arranged side by side and radial to the hollow shaft and carried by said frame said filters adapted to discharge into the hopper; substantially as described.

13. In filtering apparatus of the character described, a rotatable frame, a plurality of filter sections carried on said frame, a plurality of washers carried on said frame, conduits connecting said filter sections with a suitable vacuum producing and fluid receiving apparatus, conduits connecting said filter sections with a suitable source of fluid pressure supply, conduits connecting said washers with a suitable source of washing fluid supply, and valve devices actuated by the rotation of said frame to open and close said conduits in proper sequence; substantially as described.

14. In filtering apparatus of the character described, a rotatable frame provided with a series of radially disposed partitions, a series of filters spaced apart and fitting between said partitions, and a stationary hopper located within the frame, the partitions forming inclines for directing the solids discharged from the filters into the hopper; substantially as described.

15. In filtering apparatus of the character described, a rotatable frame provided with a series of radially disposed partitions, a series of filters spaced apart and fitting between said partitions, and a stationary hopper located within the frame, the partitions forming inclines for directing the solids discharged from the filters into the hopper, and a series of washing devices alternating with the filters; substantially as described.

16. In filtering apparatus of the kind described, the combination with the rotatable frame and its filtering devices, of a liquid container inclosing the same and rotating with the frame, a stationary hollow shaft upon which a hopper is mounted and into which said hopper discharges; substantially as described.

17. In filtering apparatus of the kind described, the combination with the rotatable frame and its filtering devices, of a liquid container inclosing the same and rotating with the frame, a stationary hopper, and a stationary hollow shaft upon which the hopper is mounted and into which said hopper discharges, the discharge from the shaft being governed by a conveyer screw located therein; substantially as described.

In testimony whereof I affix my signature, in presence of two witnesses.

ARTHUR A. HOLLAND.

Witnesses:
 JOHN C. PENNIE,
 WILLIAM H. DAVIS.